2,826,546
CYANOGEN CHLORIDE SOLUTIONS

George W. Walpert and Edwin K. Mahlo, Texas City, Tex., assignors to Monsanto Chemical Company, St. Louis, Mo., a corporation of Delaware No Drawing. Application January 3, 1956
Serial No. 556,830

10 Claims. (Cl. 252—1)

This invention relates to cyanogen chloride and, more specifically, to cyanogen chloride solutions. The invention also relates to the recovery of cyanogen chloride from a gas mixture containing the same by means of a selective solvent.

Cyanogen chloride is the starting material for the synthesis of cyanuric chloride which is an important intermediate in the manufacture of many products such as chemotherapeutic agents, insecticides, dyes, brightening agents, synthetic resins, plastics, rubber, and explosives. For use in polymerization to cyanuric chloride, however, the cyanogen chloride employed must be of a relatively high degree of purity. As produced industrially by the vapor phase reaction of hydrocyanic acid and chlorine, the gaseous cyanogen chloride product contains hydrogen chloride as the main impurity. Present methods for separation and recovery of the cyanogen chloride involve several complicated and time-consuming steps. It has now been determined that the gaseous cyanogen chloride product can be treated with certain solvents which extract the cyanogen chloride from the mixture thus providing a means for concentrating and/or separating the mixture as well as one for storing cyanogen chloride in the form of solutions in these solvents.

It is an object of the present invention to provide a class of solvents having exceptional utility in the aforementioned application. Other objects and advantages will become apparent from the following description of the invention.

It has now been discovered that benzene and methyl-substituted benzenes are good selective solvents for cyanogen chloride. The efficacy of these solvents for the purpose of the invention can be readily appreciated from a consideration of the data in Table I which were obtained by careful physical measurements and the usual calculations using these data and which show the high solubility of cyanogen chloride at the given temperature and pressure in the compounds of the group described.

TABLE I
Solubility of cyanogen chloride

| Solvent | Temp. (°C.) | Press. (mm. of Hg) | Volumes of CNCl dissolved by one Volume of Solvent |
|---|---|---|---|
| Benzene | 25.3 | 258 | 40.2 |
| Do | 23.5 | 450.2 | 100.9 |
| Toluene | 23.4 | 231.3 | 34.3 |
| Do | 23.3 | 249.1 | 37.4 |
| Do | 25.8 | 323.9 | 47.9 |
| Do | 24.4 | 505.2 | 105.4 |
| Do | 24.4 | 620.7 | 162.7 |
| Xylene [1] | 23.9 | 284.6 | 35.5 |
| Do | 24.7 | 499 | 78.8 |
| Do | 24.3 | 612.7 | 121.0 |
| Mesitylene | 23.2 | 333 | 33.6 |
| Do | 23.8 | 352 | 36.0 |
| Do | 23.7 | 539 | 72.5 |
| Do | 25.5 | 560 | 72.6 |
| Do | 23.7 | 664.5 | 109.0 |

[1] Mixture: 60% m-xylene; 24% p-xylene; 14% ethylbenzene.

To be useful as selective solvents in the instant application, this class of materials must also have a low solubility for hydrogen chloride which is the main impurity found in the industrial cyanogen chloride product. The solvents of the invention exhibit just such desirable low solubility, as is evidenced in Table II, in which data are presented for the solubility of HCl in benzene and the methyl-substituted benzenes.

TABLE II
Solubility of hydrogen chloride

| Solvent | Temp. (°C.) | Press. (mm. of Hg) | Volume of HCl dissolved by one Volume of Solvent |
|---|---|---|---|
| Benzene [1] | 25 | 380 | 4.7 |
| Do | 25 | 760 | 7.5 |
| Toluene | 23.5 | 390.6 | 4.8 |
| Do | 24.1 | 684.2 | 8.1 |
| Xylene [2] | 23.7 | 382.8 | 4.7 |
| Do | 24.8 | 616.0 | 7.4 |
| Mesitylene | 24.7 | 345.0 | 4.7 |
| Do | 26.5 | 609.1 | 7.1 |

[1] Literature values.
[2] Mixture as in Table I above.

According to the invention, these solvents are most efficiently used in the extraction of cyanogen chloride from gas mixtures thereof with hydrogen chloride such as are obtained from the reaction of hydrocyanic acid and chlorine, for example. The gas stream is treated with the aforementioned solvents in any convenient manner well known to those skilled in the art as, for example, by continuous countercurrent absorption under pressure in a suitable column. The solvent with its preferentially or selectively dissolved cyanogen chloride is then transferred to a suitable desorption column which is maintained under pressure and temperature conditions such as to release the dissolved cyanogen chloride from the solvent. The stripped solvent may be recycled to the extraction column to contact additional quantities of gas. The HCl component and any other components of the gaseous mixture which are not extracted by the solvent in the extraction column may be withdrawn therefrom and disposed of or treated in any desired manner.

In addition to the utility of these solvents in the recovery of cyanogen chloride for immediate process use, they are particularly suited for storing cyanogen chloride. In such instances, the liquid solvent saturated with cyanogen chloride may be charged into pressure cylinders from which the dissolved cyanogen chloride may subsequently be evolved at will by releasing the pressure. Any of the known inhibitors commonly employed for preventing the polymerization of cyanogen chloride such as tetrasodium pyrophosphate, for example, can be added to stabilize the solution.

The solvents described herein may be used per se or in mixtures with each other or with other cyanogen chloride solvents.

What is claimed is:
1. A composition of matter consisting essentially of a solution of cyanogen chloride in a compound selected from the group consisting of benzene and the methyl-substituted benzenes.
2. A composition of matter consisting essentially of a solution of cyanogen chloride in benzene.
3. A composition of matter consisting essentially of a solution of cyanogen chloride in toluene.
4. A composition of matter consisting essentially of a solution of cyanogen chloride in xylene.
5. A composition of matter consisting essentially of a solution of cyanogen chloride in mesitylene.

6. In a process for the concentration of cyanogen chloride from a gas containing the same together with hydrogen chloride, the step which consists essentially of contacting said gas with a compound selected from the group consisting of benzene and the methyl-substituted benzenes.

7. In a process for the concentration of cyanogen chloride from a gas containing the same together with hydrogen chloride, the step which consists essentially of contacting said gas with benzene.

8. In a process for the concentration of cyanogen chloride from a gas containing the same together with hydrogen chloride, the step which consists essentially of contacting said gas with toluene.

9. In a process for the concentration of cyanogen chloride from a gas containing the same together with hydrogen chloride the step which consists essentially of contacting said gas with xylene.

10. In a process for the concentration of cyanogen chloride from a gas containing the same together with hydrogen chloride the step which consists essentially of contacting said gas with mesitylene.

No references cited.